United States Patent Office 3,580,928
Patented May 25, 1971

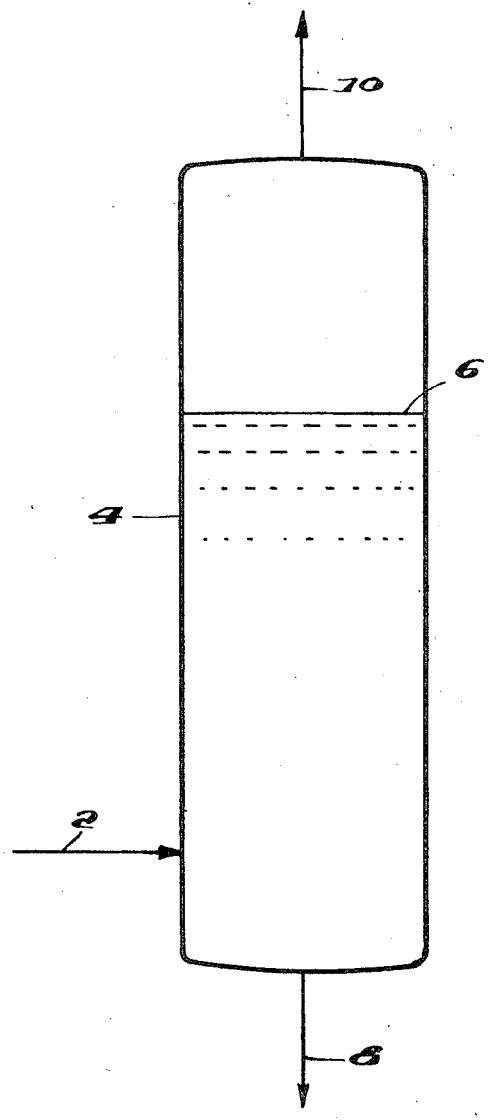

3,580,928
PROCESS FOR PURIFYING ACETALS
Francis B. McAndrew, Springfield, Martin B. Price, Berkeley Heights, and Frank M. Berardinelli, South Orange, N.J., assignors to Celanese Corporation, New York, N.Y.
Filed Feb. 12, 1968, Ser. No. 704,905
Int. Cl. C07c 43/30; C07d 13/02, 15/04, 17/00, 19/00
U.S. Cl. 260—340
5 Claims

ABSTRACT OF THE DISCLOSURE

Acetals such as trioxane which contain impurities are purified by contacting them in the vapor state with liquid sodium in order to react the impurities with the liquid sodium whereby the impurities precipitate out as solids. The resulting purified acetal is separately recovered.

BACKGROUND OF THE INVENTION

The present invention relates to a process for the purification of acetals containing impurities. More particularly, the present invention relates to a process for the removal of impurities such as water, formic acid and the like from trioxane by reacting the impurities with liquid sodium whereby they precipitate out as solids.

It is well known that trioxane, which is a cyclic trimer of formaldehyde, may be polymerized, either alone or with comonomers, to yield the commercially important oxymethylene polymers and copolymers, respectively. The trioxane monomer, which is manufactured in several ways from aqueous formaldehyde solutions, for example, by heating the solutions in the presence of a strong mineral acid such as sulfuric acid, has been found to contain impurities such as water, formic acid, methanol and the like. When trioxane containing these impurities is polymerized, either alone or with comonomers, most of the impurities act as chain transfer agents, causing chain transfer reactions to occur, thereby yielding a polymer product having a lower molecular weight than desired. It has been found that the molecular weight of the resulting oxymethylene polymer decreases as the amount of these impurities contained in the trioxane monomer feed increases, and eventually polymerization is retarded.

The term "impurity" as used in the present specification and claims is meant to include water; oxygen; alcohols and ketones on which the acetals are based; and carboxylic acids and peroxides corresponding to the alcohols. The majority of these impurities interfere with the cationic polymerization of the acetal, causing chain transfer reactions to occur. One or more of these impurities are normally contained in the acetals, primarily due to the method of their manufacture.

Normally the presence of as little as 100 parts per million (p.p.m.) of such impurities in the trioxane monomer feed will cause sufficient chain transfer reactions to occur such that the molecular weight of the resulting oxymethylene polymer will be significantly lower than it would be in the absence of such chain transfer agents.

Heretofore, it has been attempted to purify the acetals such as trioxane by distillation and recrystallization. Such purification schemes, however, do not sufficiently reduce the amount of the impurities contained in the acetals and/or they are economically prohibitive on a commercial basis.

SUMMARY OF THE INVENTION

Accordingly, the primary object of the present invention is to provide an improved process for the removal of impurities from acetals such as trioxane.

In accordance with the present invention, acetals containing, or having admixed therewith, impurities are purified by contacting the impurity-containing acetals in the vapor state with liquid sodium and reacting at least a portion of the impurities with the liquid sodium. Upon reaction with the liquid sodium the impurities precipitate out as solids yielding a purified acetal which is thereafter separately recovered.

The resulting purified acetal contains less impurities than the acetal feed, and preferably is essentially free of impurities.

It has been found that by the process of the present invention acetals containing up to about 8 weight percent of impurities, based on the weight of the acetal, can be purified in about 2 seconds to about 1 minute to yield acetals containing below about 40 p.p.m. of the impurities, and preferably essentially none.

DETAILED DESCRIPTION OF THE INVENTION

For a better and more complete understanding of the present invention, its objects and advantages, reference should be had to the following description and to the accompanying drawing which is a diagrammatic illustration of the preferred embodiment of the present invention.

The process of the present invention may be used to purify any acetal, cyclic or acyclic which contains impurities.

Preferably, the acetals, cyclic and acyclic, which may be purified have a total of from 3 to 20 carbon atoms and contain at least one structural unit

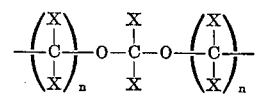

wherein $n$ is from 1 to 3, and X is either hydrogen or a hydrocarbon radical having from 1 to 6 carbon atoms and being of an aliphatic, cycloaliphatic or aromatic nature.

More preferably, the process is used to purify (a) cyclic acetals having from 5 to about 11 atoms in the ring, the atoms in the ring being exclusively carbon atoms and oxygen atoms, and the oxygen atoms being bound to two carbon atoms, and
(b) acyclic acetals which contain the structural unit

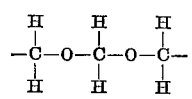

and have from 3 to 6 carbon atoms.

In most cases the acetals exclusively contain carbon atoms, hydrogen atoms and oxygen atoms.

Representative acetals which may be purified according to the present invention are trioxane; tetraoxane; 1,3-dioxane; 4-phenyl-1,3-dioxane; 4-methyl-1,3-dioxane; glycol-formal (1,3-dioxolane); 1,3,5-trioxacycloheptane; diglycol-formal (1,3,6-trioxacyclooctane); 1,4-butane-diol-formal; 1,4-butene-diol-formal; and the acyclic acetals methylal, methoxymethylal, and dimethoxymethylal.

The present purification process is especially suitable for acetals such as trioxane which is polymerizable by itself or can be copolymerized with other monomeric compounds, particularly other acetals.

The aectals may contain up to about 8 weight percent of the aforementioned impurities, based on the weight of the acetal, but normally contain from about 0.5 to 5 weight percent. Trioxane, for example, when produced from the aqueous formaldehyde solutions will contain in the range of from about 1 to 5 weight percent of such impurities as water, methanol, and formic acid. Normally water and methanol are the predominant impurities.

By using the purification process of the present invention the impurity content of the acetal may be reduced to below about 40 p.p.m., preferably below about 10 p.p.m., and more preferably essentially all of the impurities may be removed. Thus, the resulting purified acetals such as trioxane may be polymerized to yield high molecular weight polymers due to the absence of these chain transfer agents.

With reference to the drawing, vaporized trioxane containing impurities such as water, formic acid, and methanol is introduced via a conduit 2 into a conventional type liquid-gas contacting or mixing zone 4.

As previously mentioned, trioxane as manufactured normally contains from about 1 to 5 weight percent of the impurities. While such an impurity-containing trioxane may be fed directly to the zone 4 it is desirable and economical to initially subject the impurity-containing acetal to a preliminary distillation treatment to reduce the impurity content, preferably to below about 1 weight percent, based on the weight of the acetal, for example, to an amount in the range of from about 0.1 to 1 weight percent. Thusly, the trioxane purified by the method of this invention may, in effect, contain from about 0.1 to about 5 weight percent of impurities. Distillation becomes economically unattractive when it is attempted to further reduce the impurity content.

The contacting zone 4 is filled with liquid sodium to a level 6. The impurity-containing trioxane vapors upon introduction into the zone pass upwardly through the liquid whereby the impurities react with the liquid sodium to form sodium salts which are solids, for example:

$$2CH_3OH + 2Na \longrightarrow 2CH_3ONa + H_2 \uparrow$$
(Solid Salt)

The solid salt precipitate falls to the bottom of the contacting zone 4 as it is formed and is removed therefrom via a conduit 8.

The resulting purified trioxane is recovered from the zone 4 via a conduit 10 and normally thereafter condensed. The condensed purified trioxane, which is preferably essentially free of impurities due to the liquid sodium treatment, may then be polymerized to yield high molecular weight oxymethylene polymers.

If desired, during the passage of the trioxane vapors there through, the liquid sodium may be agitated in any convenient manner or baffles, Raschig rings and the like may be added to the zone 4 in order to enhance or aid the contacting between the impurity-containing trioxane vapors and the liquid sodium. Preferably, the trioxane vapors are introduced into the sodium liquid through a sparger.

The impurity-containing trioxane may be contacted and the impurities reacted with the liquid sodium in the contacting zone 4 at any convenient temperature and pressure provided the trioxane is continuously maintained in the vapor state therein. Normally, temperatures in the range of from about 125° C. to 250° C., and preferably from about 140° C. to 160° C. are employed. Atmospheric pressure is preferred, however, if desired, higher or lower pressures may be used. Preferably, an atmosphere of an inert gas such as nitrogen, argon and the like is maintained in the zone 4 in the vapor space above the sodium liquid level 6.

Surprisingly, under the above conditions it has been found that the impurities can be reduced from above about 0.1 weight percent, for example, 0.1 to 1 weight percent, to below about 40 p.p.m., and preferably essentially completely removed from the trioxane, in about 2 to 30 seconds, the time being based on the period of contact between the trioxane vapors and the liquid sodium. When larger amounts of impurities are contained in the trioxane longer residence or reaction times are necessary to remove essentially all of the impurities. For example, when up to about 8 weight percent of impurities are present up to about 1 minute of contacting time between the impurity-containing trioxane and the liquid sodium is necessary in order to lower the impurity content to below about 40 p.p.m., for example, below 10 p.p.m.

While the above discussion of the drawing and the reaction conditions employed in the zone 4 has been with specific reference to trioxane it is equally as applicable to each of the other aforementioned acetals which may be purified by the present invention. Obviously, some of the other acetals may require slightly different temperatures to maintain them in the vapor state during passage through the liquid sodium.

The present invention is additionally illustrated by the following examples.

Example I

Crude trioxane obtained via an aqueous formaldehyde solution and containing about 4 weight percent of impurities including 1.5 weight percent water, 0.5 weight percent formic acid, and 2 weight percent methanol, based on the trioxane, is subjected to a distillation treatment whereby the impurity content is reduced to 0.2 weight percent. The predistilled trioxane is vaporized and introduced into the bottom of a contacting column containing molten sodium at about 130° C. to 140° C. The trioxane vapors are passed into the liquid sodium through a sparger having a 1/16 inch diameter orifice. As the vapors pass upwardly through the molten sodium the impurities react with the sodium forming a solid precipitate which accumulates in the bottom of the column.

Trioxane vapors are recovered from the top of the column having been in contact with the molten sodium for about 5 seconds. The trioxane vapors are condensed yielding pure trioxane, B.P. 114.3° C. The resulting product trioxane may be resublimed and remelted several times without detectable polymer formation, indicating the essential absence of impurities.

The purified trioxane can then be polymerized to yield oxymethylene polymers having a molecular weight of up to about 750,000 (number average).

For example, the purified trioxane is thereafter copolymerized with ethylene oxide in the presence of triphenylmethyl hexafluoroarsenate catalyst to yield a copolymer product, which has a melt index (MI)[1] value of 0.27.

A sample of the same impurity-containing trioxane, but without the sodium treatment, is copolymerized in the same manner in the presence of the same type of catalyst and yields a copolymeric product having a melt index value of 15.3.

It can be seen from the above that the impurities in the non-sodium treated trioxane cause considerable chain transfer reactions to occur thereby reducing the molecular weight of the resulting copolymer. The removal of these impurities via the process of the present invention yields the desired high molecular weight polymer.

Similar results may be obtained when the trioxane is homopolymerized.

The principal, preferred embodiment, and mode of operation of the present invention have been described in the foregoing specification. However, it should be understood that the invention which is intended to be protected herein, may be practiced otherwise than as described without departing from the scope of the appended claims.

---
[1] Melt index is a measure of the molecular weight of a polymer. The higher the value, the lower the molecular weight.

We claim:
1. In a process for the purification of impurity containing acetals wherein the impure acetals are contacted with sodium the improvement which comprises, passing said acetal in the vapor state through liquid sodium so as to react at least a portion of the impurities with the liquid sodium whereby the impurities precipitate out as solids, and thereafter recovering the resulting purified acetal containing less impurities than the feed acetal.

2. The improved process of claim 1 wherein the acetal to be purified has from 3 to 20 carbon atoms and contains at least one structural unit,

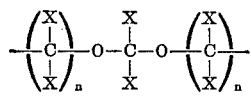

wherein $n$ is from 1 to 3, and $x$ is selected from the group consisting of hydrogen and hydrocarbon radicals having from 1 to 6 carbon atoms, and the acetal contains from about 0.1 to about 5 weight percent of impurities, based upon the weight of the acetal.

3. The improved process of claim 2 wherein the vaporized impurity containing acetal is passed through the liquid sodium for a period of time of from about 2 seconds to about 1 minute to yield a purified acetal containing less than 40 p.p.m. of impurities.

4. The improved process of claim 3 wherein the impure acetal contains at least one impurity selected from the group consisting of water; oxygen; alcohols and ketones on which the acetals are based; and carboxylic acids and peroxides corresponding to the alcohols.

5. The improved process of claim 4 wherein the vaporized acetal to be purified is trioxane.

References Cited
UNITED STATES PATENTS
3,410,760  11/1968  Craig et al. _____ 260—616X

FOREIGN PATENTS
1,053,808  1/1967  Great Britain _____ 260—340
1,027,562  4/1966  Great Britain _____ 260—340

NORMA S. MILESTONE, Primary Examiner

U.S. Cl. X.R.

260—338, 340.7, 340.9, 616